No. 645,904. Patented Mar. 20, 1900.
I. D. STOCKTON.
CULTIVATOR.
(Application filed Dec. 6, 1897.)
(No Model.)

Witnesses
Devey Engman.
E. A. Waterman.

Inventor
Isaac Denton Stockton
by Townsend Bros.
his Attys.

THE NORRIS PETERS CO., PHOTO-LITHO., WASHINGTON, D. C.

UNITED STATES PATENT OFFICE.

ISAAC DENTON STOCKTON, OF PENROSE, CALIFORNIA.

CULTIVATOR.

SPECIFICATION forming part of Letters Patent No. 645,904, dated March 20, 1900.

Application filed December 6, 1897. Serial No. 660,965. (No model.)

*To all whom it may concern:*

Be it known that I, ISAAC DENTON STOCKTON, a citizen of the United States, residing at Penrose, in the county of Ventura and State of California, have invented new and useful Improvements in Cultivators, of which the following is a specification.

The object of my invention is to provide a superior cultivator for thoroughly cutting, loosening, and pulverizing the soil and for destroying weeds, and also to provide superior simplicity and ease of construction and operation.

The accompanying drawings illustrate my invention.

Figure 1:
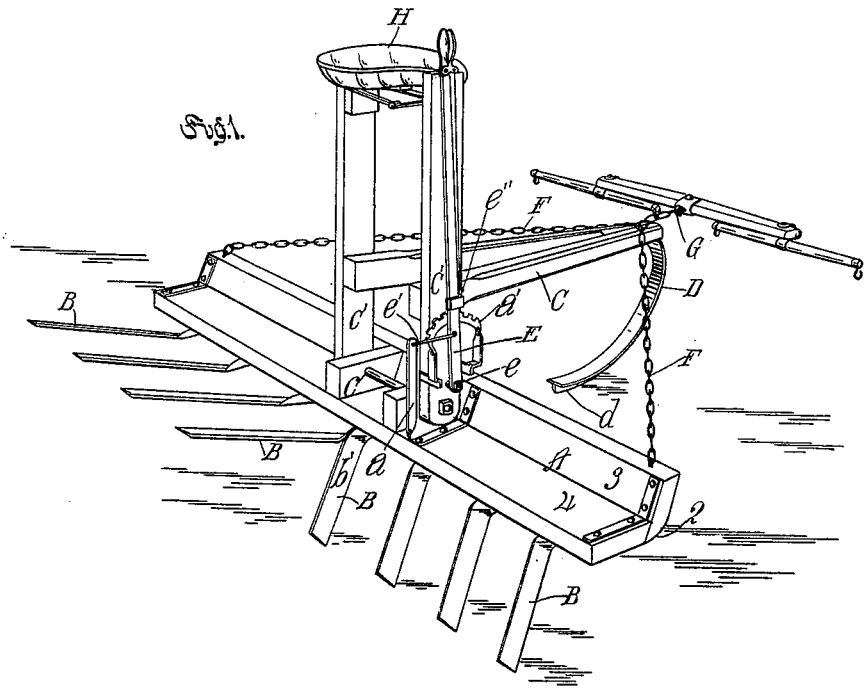
Figure 2:
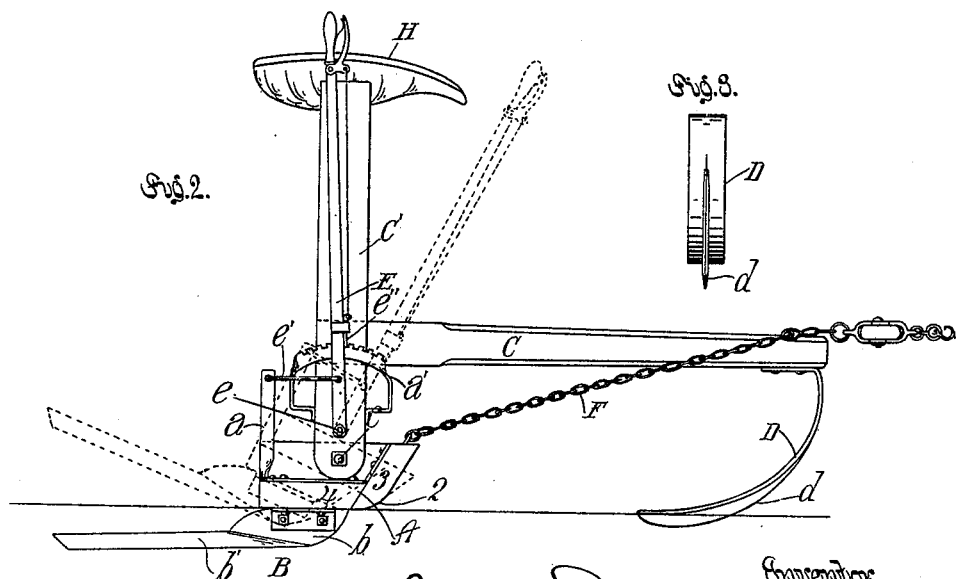
Figure 3:
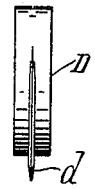

Figure 1 is a perspective view of my newly-invented cultivator resting upon the ground. Fig. 2 is a side elevation of the cultivator at work, dotted lines showing the device with the blades thrown out of the ground. Fig. 3 is a front elevation of the runner for the front end of the tongue.

A indicates a cross-beam, on the under side of which and on opposite sides of the middle thereof are arranged cultivator-blades B, having, respectively, a front member $b$, fastened to the beam, with its width in a vertical plane, and a rear member $b'$, extending obliquely behind the beam and inclined upwardly from the front rearwardly. C indicates a tongue connected with such cross-beam and provided at its front end with any suitable support or runner D to rest upon the ground. This may be a wheel; but I prefer the form of runner shown, the same being a curved flat bar provided with a guiding or cutting edge or rib $d$, projecting from its under surface. The tongue is rigidly connected to the standards C' preferably at a distance from the ground, and the cross-beam is preferably pivotally secured to the lower ends of the standards, as by the bolt or pivot $c$. The standards are preferably made vertical, so that the weight of the driver is placed directly over the cross-beam, preferably a trifle nearer the front than the rear, so that in any change that is to be made in the angle or position of the cross-beam there is no more leverage to be overcome in moving it in one direction than in the other. A lever connection is preferably provided between the beam and the tongue to hold the tongue at any desired angle with the beam.

E indicates a lever pivoted to the standards C' by a pivot $e$.

$a$ indicates a standard fastened to the beam A, and $e'$ indicates a connecting-rod connecting the lever E with the cross-beam through the medium of the standard. The lever E is provided with a ratchet $e''$.

$a'$ indicates a rack fastened to the standard C' to hold the lever.

F indicates a draft connection fastened to the beam and resting upon the tongue. The tongue is practically held by the angle at the front of the draft connection, but is not fixed thereto. The doubletrees G are fastened to said draft connection.

The front lower corner of the cross-beam is rounded, as at 2, so that when the machine is pulled forward it will run readily over the ground and over small obstructions.

In practical operation when it is desired to move the machine along the ground without cultivating the lever E will be left free and will be thrown into the position shown by dotted lines in Fig. 2. To force the blades into the ground, the lever will be drawn back and held by the ratchet and rack, as indicated in solid lines in Figs. 1 and 2.

H indicates a seat fastened to the top of the standards C'.

The cutter $d$ of the runner is intended to keep the runner from sliding too freely from side to side. The flat portion of the runner keeps it from sinking into the ground.

The cross-beam is preferably made of two members 3 4, of oblong cross-section, and fastened together at an angle in cross-section to give great strength to the beam and considerable height to the front of it.

It is to be seen that in practical operation when cultivating the tongue is rigid with the cross-beam and that the pivoted lever is simply for relative adjustment.

Now, having described my invention, what I claim as new, and desire to secure by Letters Patent, is—

1. A cultivator comprising a cross-beam, provided with blades and having its front portion sled-shaped; a seat-standard pivotally secured to the beam; a seat thereon; a short standard secured to the beam; a tongue and a rack rigidly secured to the seat-standard; a ratchet-lever connected with the short standard and pivotally secured to the seat-standard; a support for the front end of the tongue; and a draft connection secured to the ends of the beam and resting upon the tongue above its support.

2. A cultivator comprising a sled-shaped cross-beam provided with blades; a vertical seat-standard pivotally secured to the central portion of said beam, intermediate its front and rear edges; a tongue rigidly connected with the seat-standard; means for adjusting the position or angle of the beam relatively to the standard above the pivotal point; a support for the front end of the tongue; and draft connections secured to the ends of the beam and resting upon the tongue above the support.

ISAAC DENTON STOCKTON.

Witnesses:
JAMES R. TOWNSEND,
BRICE GRIMES.